May 22, 1956 G. G. ZACHARY 2,746,716
WIRE GUIDE
Filed May 22, 1953
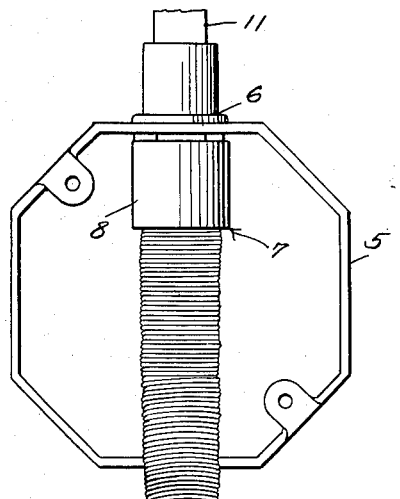
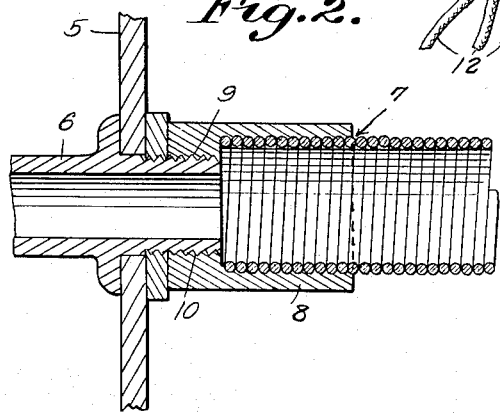
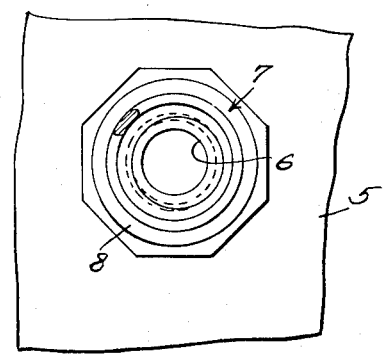
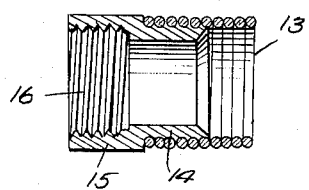
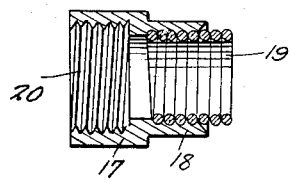
George G. Zachary
INVENTOR
BY C. A. Snow & Co.
ATTORNEYS United States Patent Office 2,746,716
Patented May 22, 1956

2,746,716
WIRE GUIDE

George G. Zachary, Los Angeles, Calif.

Application May 22, 1953, Serial No. 356,727

4 Claims. (Cl. 254—134.3)

This invention relates to a wire guide designed primarily for use in guiding electric conductor wires into a conduit or metal raceway, wherein the raceway terminates in a lock nut.

The primary object of the invention is to provide a wire guide which will guide the wire being installed, into such conduit or metal raceway in such a way as to prevent the rubbing or chafing of the wire to strip insulation from the wires as the wires are being pulled.

Another object of the invention is to provide a guide which may be positioned with one end thereof secured over a wire opening of a wall box to guide the wire being moved therethrough, when the wall boxes are located high overhead or in obscure places, the wire guide being threaded over the usual fitting of the wall box, holding the guide in position.

Still another object of the invention is to provide a guide in the form of a coiled wire member substantially tubular in shape, through which wires are pulled and which will prevent the kinking of the wire and will also act to straighten the wire if a knot occurs therein during the installation of the wire.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings:

Figure 1 is an elevational view of the open side of a wall box illustrating a guide supported in accordance with the invention as secured to a conductor fitting.

Fig. 2 is a fragmental sectional view through the fitting and connected in the guide.

Fig. 3 is a fragmental elevational view of the guide secured to the fitting.

Fig. 4 is a sectional view through the guide illustrating the coiled spring of the guide secured to the reduced end of the sleeve.

Fig. 5 illustrates a further modified means of securing the guide to its sleeve.

Referring to the drawing in detail, the reference character 5 indicates a wall box and the reference character 6 indicates the conventional conductor fitting used in wall boxes to receive the usual conduit.

The device forming the essence of the present invention is indicated generally by the reference character 7 and includes a length of wire formed into a coil providing a substantially tubular structure.

The device also includes a sleeve 8 internally threaded to cooperate with the convolutions of the coiled wire in securing the guide to the sleeve. The sleeve 8 is formed with a reduced internally threaded end 9 fitted over the threads 10 of the fitting or pipe section 6, firmly securing one end of the guide in position.

The guide 7 is of a length so that one end thereof will extend a substantial distance beyond the the opposite side of the box 5, to which the guide is secured, so that the wires being pulled therethrough, and which are indicated by the reference character 12 will be guided through the lock nut to the conduit or metal raceway attached to the box 5, in such a way as to prevent rubbing or chafing of the wire as it enters the pipe 11, which usually results in the insulation being stripped from the wires being pulled.

As shown by Fig. 4 of the drawing, the coiled spring 13 threads upon and is welded to the reduced extension 14 of the pipe 15, which pipe 15 is formed with internal threads 16 that screw over the conventional threaded end of the conduit or metal raceway extending into the wall box.

As shown by Fig. 5 of the drawing, a modified form of pipe section 17 is provided, which is formed with a reduced end 18 internally threaded and into which one end of the coiled spring 19 is threaded.

Internal threads 20 are provided in this form of the invention for threading over the threaded end of the conduit or metal raceway extending into a wall box.

From the foregoing it will be seen that due to the construction shown and described, I have provided a guide which may be readily and easily secured to a wall box or to one end of a conduit or metal raceway through which electric conductor wires are being pulled, the guide acting as a means to guide the wires into the conductor or metal raceway in such a way that they will not rub the edges of the conduit or raceway to strip the insulation from the wires and render them unfit for use.

Having thus described the invention, what is claimed is:

1. In combination with a wall box having externally threaded fittings therein, a wire guide comprising a rigid sleeve having one extremity internally threaded for engagement with the externally threaded extremity of a fitting within said wall box, and a flexible tubular guide body threadedly engaged with the opposite extremity of said sleeve, said flexible tubular guide body being formed from a length of coiled wire and said opposite extremity of the guide sleeve being provided with a threaded portion complementary to the configuration of said guide body, the length of said guide body being greater than the width of said wall box so that the free extremity of the guide body will be disposed externally of said wall box when said wire guide is connected with one of the fittings therein.

2. A wire guide for use in installing wire in an externally threaded conduit, said guide comprising a sleeve provided with an internally threaded extremity for engagement with said conduit, and a flexible tubular guide portion formed from a length of coiled wire threadedly engaged with the opposite extremity of said sleeve.

3. A wire guide as set forth in claim 2 where said tubular guide portion is engaged with said sleeve internally thereof.

4. A wire guide as set forth in claim 2 where said tubular guide portion is connected to said sleeve externally thereof.

References Cited in the file of this patent

UNITED STATES PATENTS

| | | |
|---|---|---|
| 1,076,870 | Dahl | Oct. 28, 1913 |
| 1,218,570 | Koch | Mar. 6, 1917 |
| 1,506,681 | Smith | Aug. 26, 1924 |
| 2,515,724 | McCroskey | July 18, 1950 |